Nov. 3, 1931.  J. H. CAMDEN ET AL  1,830,347
TRAY SUPPORT FOR AUTOMOBILES
Filed Nov. 11, 1929
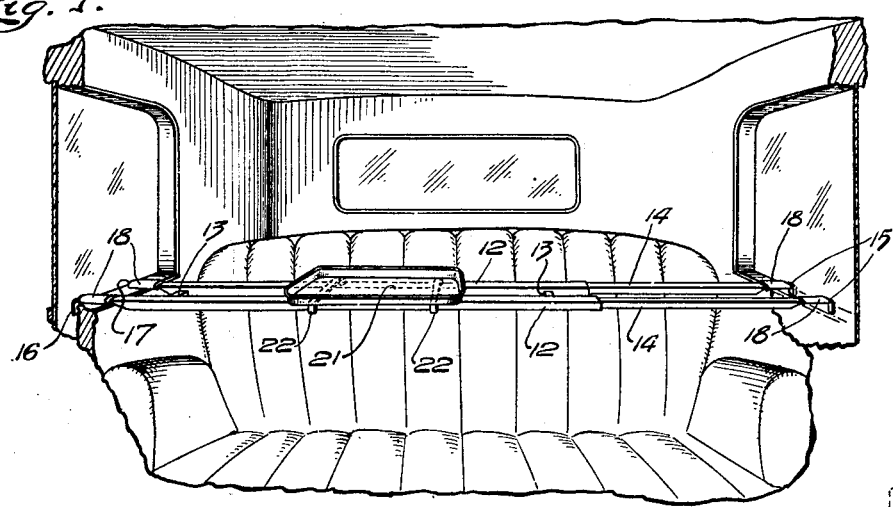
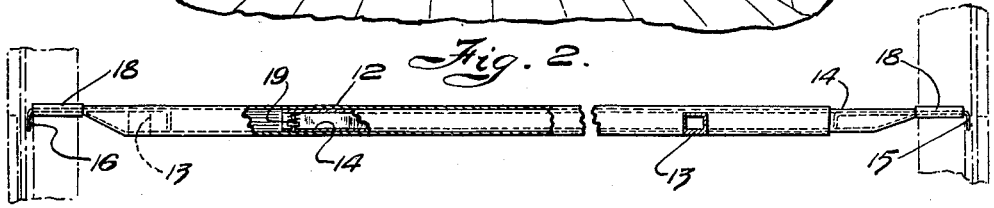
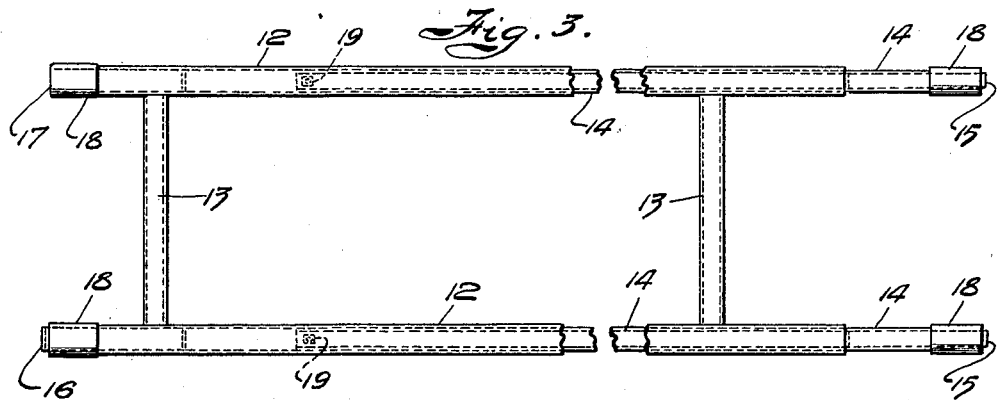
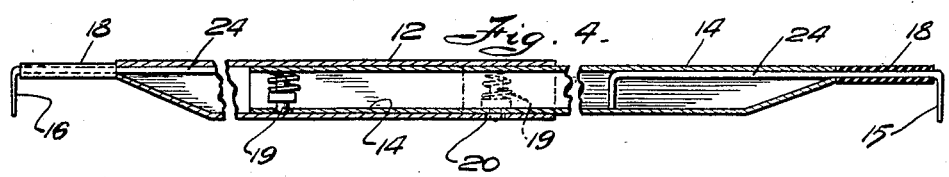
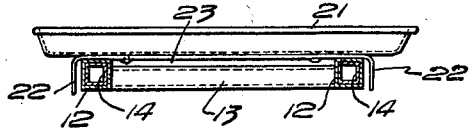
Inventors
John H. Camden,
Bert Powell,
By
Attorneys Patented Nov. 3, 1931

1,830,347

UNITED STATES PATENT OFFICE

JOHN H. CAMDEN AND BERT POWELL, OF JACKSONVILLE, FLORIDA

TRAY SUPPORT FOR AUTOMOBILES

Application filed November 11, 1929. Serial No. 406,408.

This invention relates to a tray support for automobiles and the like, adapted to be placed in front of the seat or seats of the vehicles and intended for use when meals are to be served or when it may be desired to use it as a table for other purposes. The said support is more especially intended for use in connection with closed cars, as it may be mounted in place when the windows of the car are shut.

This improved support consists of a frame comprising two hollow main side bars rigidly connected together by cross bars. Each side bar is provided with a telescoping bar member, these telescoping members sliding freely within the hollow side bars and being independently adjustable so that the support is intended for use in vehicles of different widths. The telescoping members are preferably hollow and are provided at their ends with hooks which may be engaged with the window frame on one side of the vehicle, these hooks being adapted to engage the window frame inside of the glass. One of the main side bars of the frame is provided at its end opposite to its telescoping member with a hook to engage an opposite window frame and the other of said bars has a plain extension serving as a rest. This construction permits the tray support not only to be adjusted, as just stated, to fit cars of different widths, but also permits it to be properly placed in tapering or inclined parts of the vehicles. The portions of the frame and the extensible members which are to rest on the window frames are preferably covered with some soft material, as rubber, to prevent the ledges of the window frames from being marred.

In the drawings Fig. 1 is a general view showing the improved support in operative position in an automobile, with a tray resting thereon. Fig. 2 is a side view of the support, partly broken away. Fig. 3 is a partly broken-out plan view of the improved support. Fig. 4 is a broken-out section of one of the side bars and a telescoping extension, on a somewhat larger scale than the other views. Fig. 5 is a cross section of the support showing a tray resting thereon.

Referring to the drawings, 12 denotes the hollow side bars of the frame, and 13 the cross bars rigidly connecting said side bars and secured thereto in any suitable manner, as by brazing or welding. For lightness of construction the cross bars will also preferably be of hollow tubing.

Telescoping within the side bars 12 are extensible or adjustable members 14 provided at their outer ends with hooks 15 to engage a window frame. One of the side bars 12 is provided at its end opposite this telescoping member with a hook 16 and the other of said bars has a plain extension or rest 17. this bar being slightly shorter than the bar carrying the hook 16. The hooks 15 and 16 and the plain extension 17 which are to rest on the ledges of the window frames of the vehicle are preferably covered with a soft material, preferably consisting of rubber sleeves 18 which may be slipped in place and which will prevent these parts which are to rest on the window frames from marring said frames. The hooks 15 and 16 may be provided with long, inwardly extending shanks 24 by which they may be secured to the bars 12 and 14 in any suitable manner. The plain rest part 17 extends to the end of the shorter side bar 12 and affords a convenient means for adjusting the frame on the tapering side portions of automobile frames.

It will be noted that the hooks 15 and 16 serve to hold the tray support on the window frames inside of the windows which may be raised and lowered without disturbing the tray support. This is an important and advantageous feature of the invention.

To prevent accidental displacement of the telescoping members 14 each of the side bars is provided with a friction device consisting preferably of a spring-pressed pin 19 the projecting end of which will press against the inside of a side bar in such a manner as to give each telescoping member a certain frictional grip on the side bar so that when the telescoping members are shoved back within the side bars, in collapsing the support, they will not accidentally fall out or be displaced when the frame is being handled.

Also to prevent the telescoping members from being entirely drawn out of the side bars, in adjusting said members, each of said side bars is provided with a hole or recess 20 into which the slightly projecting end of the friction pins 19 will extend so as to serve as stops in drawing out the side bars. This stopped or locked position of the pin 19 is shown in dotted lines in Fig. 4. The extension bars can, however, be removed, when desired, by a slight forceful pull thereon which will cause the projecting ends of the friction pins, and which ends are preferably slightly rounded, to yield in such a manner as to permit the removal of said extension bars.

All of the main parts of the support are made of metal tubing, so that the support, while strong, will be comparatively light, and may be constructed at no great expense owing to the fact that the metal tubing can be bought on the market as a commercial article. This tubing may be of brass, steel or any other suitable metal, as will be understood, and will preferably be square in cross-section, as shown.

In connection with the support above described a tray 21, provided on its under side with two sets of lugs 22, spanning the side bars of the frame, will preferably be employed. These lugs are so placed that the tray will loosely fit on the frame, when placed either lengthwise of crosswise, thereon, and thus two or more trays of a suitable size may be supported on the said frame if desired.

The cross bars 13 are preferably depressed below the upper surface of the side bars 12 to afford a suitable clearance between the bars 23, attached to the tray or trays, and said cross bars, and which bars are turned downward at their ends to form the lugs 22.

Having thus described our invention we claim and desire to secure by Letters Patent:

1. A tray support for automobiles and other vehicles consisting of a frame comprising hollow main side bars, cross bars rigidly connecting said side bars, independently adjustable bar members telescoping within said side bars and provided at their outer ends with hooks to engage the window frames inside of the windows, one of said main side bars being provided at one end with a hook and the other having a plain rest extending at its other end, said telescoping members being provided with friction devices, consisting of spring-pressed pins, to prevent accidental displacement thereof.

2. A tray support for automobiles and other vehicles consisting of a frame comprising hollow main side bars, cross bars rigidly connecting said side bars, independently adjustable bar members telescoping within said side bars and provided at their outer ends with hooks to engage the window frames inside of the windows, one of said main side bars being provided at one end with a hook and the other having a plain rest at one end, said telescoping members being provided with friction devices, consisting of spring-pressed pins, to prevent accidental displacement thereof, and said side bars each having a hole or recess into which said pins may extend to serve as stops to prevent said telescoping members from being accidentally drawn entirely out of said side bars.

3. A tray support, for automobiles and other vehicles, consisting of a frame comprising hollow main side bars, cross bars rigidly connecting said side bars and depressed below the upper surfaces of said side bars, independently adjustable bar members telescoping within said side bars and provided at their outer ends with hooks to engage the window frames inside of the windows, combined with a tray having cross-bars on its underside turned downward at their ends to form depending lugs loosely spanning the side bars of said frame, said depressed cross-bars affording a suitable clearance between said side bars for the lug-carrying cross-bars on the tray.

In testimony whereof we affix our signatures.

JOHN H. CAMDEN.
BERT POWELL.